United States Patent [19]
Hong

[11] Patent Number: 4,984,248
[45] Date of Patent: Jan. 8, 1991

[54] HIGH SPEED TRANSCEIVER

[75] Inventor: Hei-Tai Hong, Hsin Chu, Taiwan

[73] Assignee: Industrial Technology Research Institute, Taipei, Taiwan

[21] Appl. No.: 234,227

[22] Filed: Aug. 19, 1988

[51] Int. Cl.$^5$ .................................. H04B 1/38
[52] U.S. Cl. .......................... 375/7; 375/36; 340/825.5
[58] Field of Search ............... 375/36, 7, 121; 330/50, 330/252, 255, 275, 116; 333/25; 340/825.5, 825.51; 370/24, 28, 32, 60, 85.1

[56] References Cited

U.S. PATENT DOCUMENTS

| | | | |
|---|---|---|---|
| 3,742,450 | 6/1973 | Weller | 375/36 |
| 3,872,391 | 3/1975 | Dalley | 330/110 |
| 4,317,205 | 2/1982 | Lam | 375/7 |
| 4,337,465 | 6/1982 | Spracklen et al. | 375/36 |
| 4,384,363 | 5/1983 | Lipcon | 455/78 |
| 4,412,347 | 10/1983 | Lipcon | 455/58 |
| 4,425,663 | 1/1984 | Lam | 375/36 |
| 4,479,228 | 10/1984 | Crane | 375/7 |

Primary Examiner—Douglas W. Olms
Assistant Examiner—Stephen Chin
Attorney, Agent, or Firm—Darby & Darby

[57] ABSTRACT

In data communication systems, high speed transceivers are used to transmit and receive signals to and from the communicating medium. These transceivers can transfer data with very high data rates up to 10 mega-bit per second and provide level conversion, signal isolation, ground isolation, and high impedance. To reduce or suppress electromagnetic interference, the square wave signal is translated into a smooth signal which is converted into a signal capable of traveling through the communicating medium. Signal isolation and ground isolation avoid the danger of high voltage shock and damage to the computer equipment from atmospheric disturbances, such as lightning. High impedance provides the bus structure cabling system necessary for multiaccess.

9 Claims, 5 Drawing Sheets

HIGH SPEED TRANSCEIVER

BACKGROUND OF THE INVENTION

1. Field of the Invention

The present invention relates to a data communications transceiver used for base band packet switching, such as an Ethernet system.

2. Description of the Prior Art

A transceiver such as is used with an Ethernet system is generally disclosed in U.S. Pat. No. 4,317,205 of Tat C. Lam for a "Wideband Transceiver With EMI Suppression", granted Feb. 23, 1982.

In conventional data communication transceivers, the transmitter section is either capacitor coupled or transformer coupled to the communicating medium which medium is most commonly a shielded coaxial cable. Both methods of coupling use a regulated voltage source or emitter-coupled logic circuitry to drive the coaxial cable as found, for example, in U.S. Pat. No. 4,412,347 of Jesse B. Lipcon entitled "Precision Setting of Currents and Reference Voltages", granted Oct. 25, 1983. The voltage level of the signal will affect the skew of the received data. Noise or reflection on the transmission line can be coupled to the receiver which in turn will be received as an unwanted signal. Furthermore, the capacitive AC coupling will limit the low frequency data to the extent of the differentiation being used by the coupling.

Another problem is that when the transceiver is transmitting, electromagnetic interference may be present around the connection between the connector to the shielded cable and the shielded container of the transceiver. This electromagnetic interference is believed to be due to stray capacitance between the center conductor of the connector and the shielded container. A conventional way to minimize this effect is to shield the exposed center conductor or to make the outer connector much more capacitive relative to the shielded container than to the center conductor. This can produce switching spikes, which cause unwanted interference in the atmosphere around the transceiver because of high speed switching and this AC coupling to ground. Still another problem occurs where the transmission medium is DC coupled. The capacitance effect of the transmitter is passed to the coaxial cable, loading the communicating medium. This is found in U.S. Pat. No. 4,384,363 of Jesse B. Lipcon entitled "Transceiver For Local Network Using Carrier-Sense Multiple Access/Collision Detection", granted May 17, 1983.

SUMMARY OF THE INVENTION

The above and other problems of prior art data communication transceivers are overcome by the present invention comprising a transceiver for transmitting signals to a communicating medium.

In a preferred embodiment of the transceiver there are means for suppressing electromagnetic interference when transmitting data to the communicating medium. This electromagnetic interference is suppressed by means of a capacitor which is shunted with the input of a differential amplifier. The capacitor limits the bandwidth of transfer data by suppressing the higher order harmonic of the square wave input signals. In this way, the high frequency noise and the harmonic of the transmission data are filtered out by the capacitor which capacitor is sometimes called a rise time limit capacitor or suppression capacitor. Using this method, the transmitting data travels on the coaxial cable by fundamental wave. It has an advantage of allowing transmission over a greater distance and causing less electromagnetic radiation.

In a modified embodiment of the invention, a constant current source is employed in the connection to the transmitting circuitry. It differs from the previously mentioned method of voltage driving, using current driving to reduce the electromagnetic interference and having a greater driving distance in the coaxial cable.

In still another modified embodiment of the invention there is means for blocking the capacitance effect of the transmitter in its connection to the communicating medium. This capacitance effect of the connection to the transmitter is blocked through the use of two serially connected diodes. This capacitance effect is reduced because of the P-N junction of the diodes which are equivalent here in effect to two small serially connected capacitors.

In the preferred embodiment of the invention there are means for quick collision detection. Using the current driving method, the collision detector monitors the DC level on the coaxial cable. In this way, collisions can be detected quickly and reliably.

It is therefore an object of the present invention to provide a data communication transceiver, suitable for use with a long line coaxial cable, which suppresses noise and electromagnetic interference.

BRIEF DESCRIPTION OF THE DRAWINGS

The foregoing and other objects, features, and advantages of the invention will become apparent from the following description of certain embodiments of the invention which should be read in conjunction with the following drawings wherein.

DETAILED DESCRIPTION OF THE PREFERRED EMBODIMENT

Figure 1:
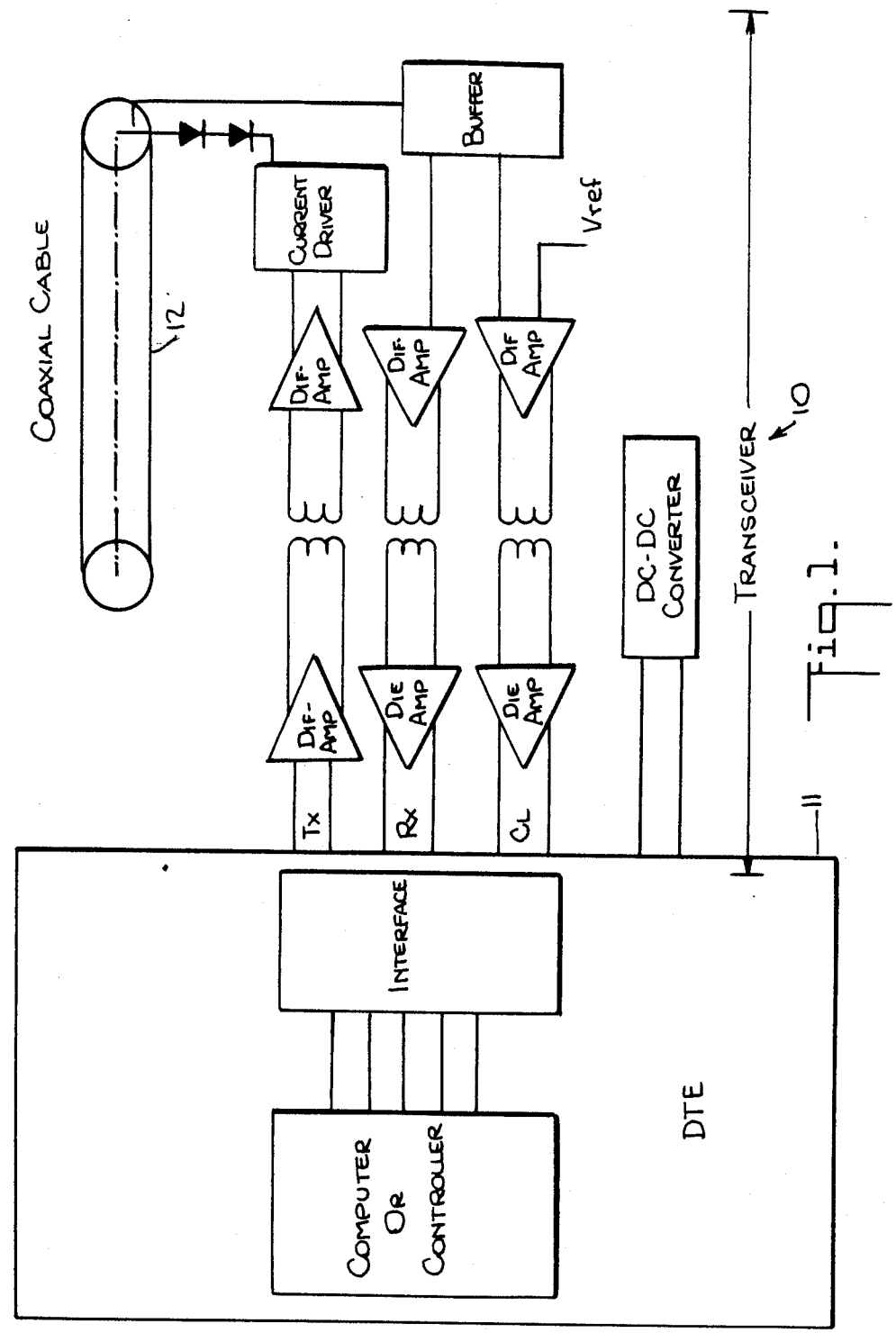
FIG. 1 shows relative location and connections between a transceiver of the present invention connected to data terminal equipment and a communicating medium.

Referring first to FIG. 1, there is shown a data communication transceiver 10 connected between data terminal equipment 11 and the communicating medium, here shown as a coaxial cable 12.

Figure 2:
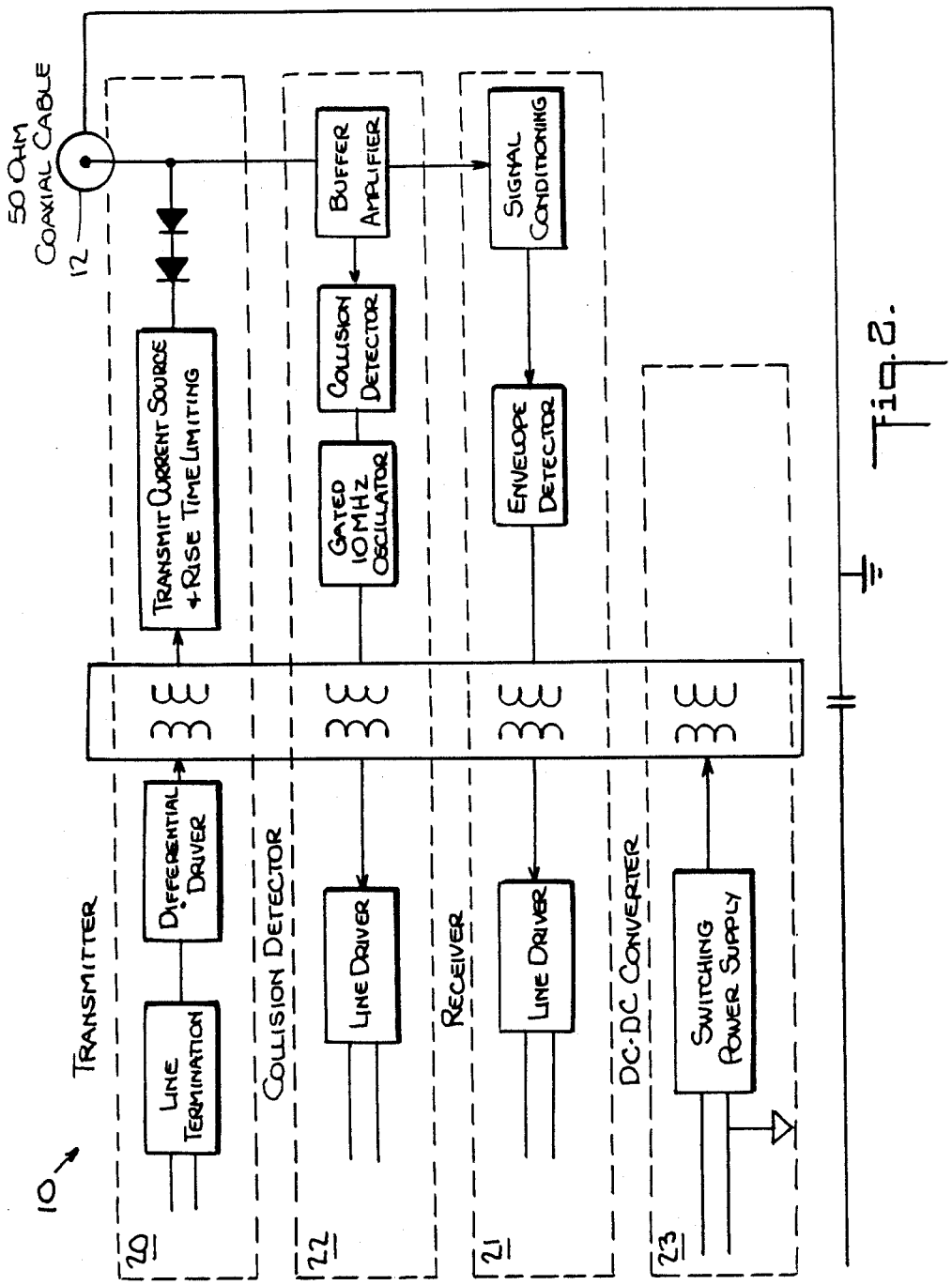
FIG. 2 is a block diagram of a transceiver of the present invention.

In the block diagram of a transceiver 10 as illustrated in FIG. 2, a data communication transceiver 10 consists of four parts, which are a transmitter 20, a receiver 21, a collision detector 22, and a DC to DC converter 23.

Figure 5:
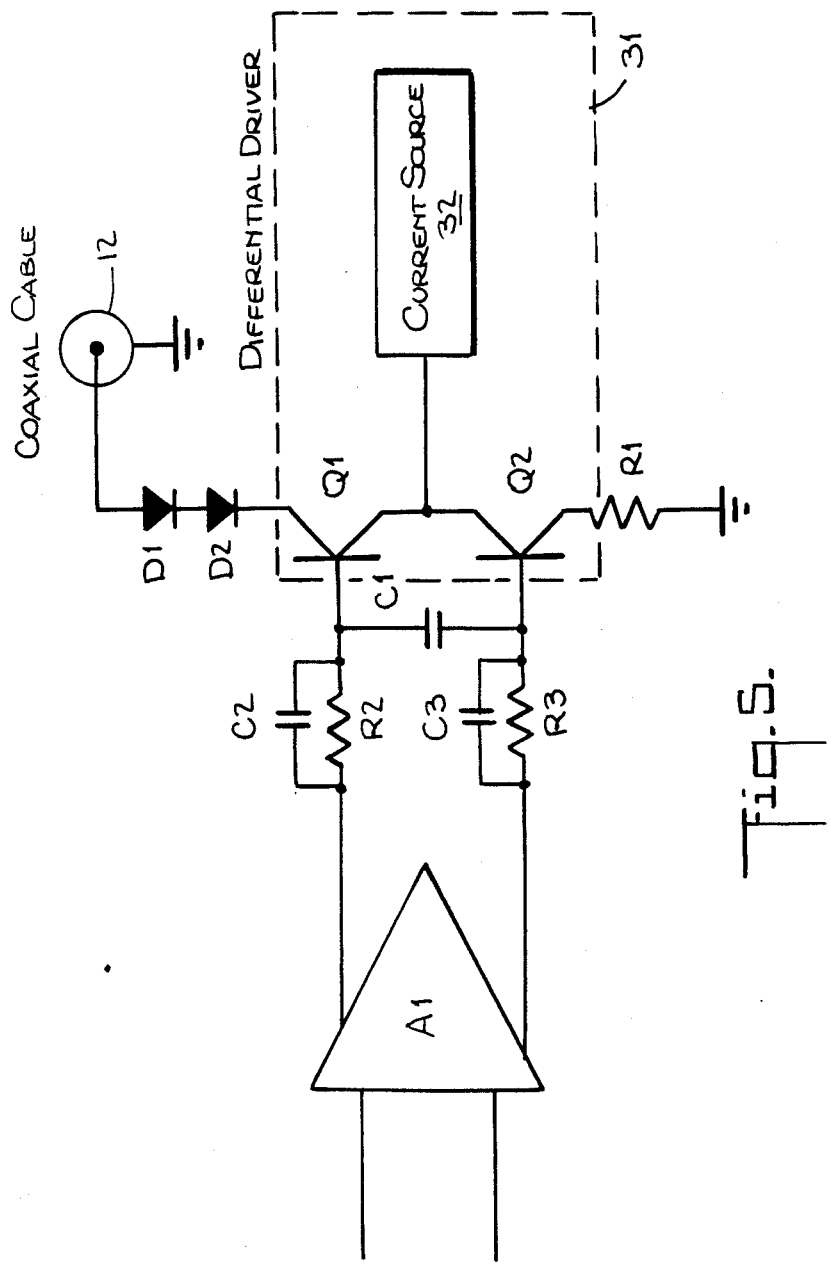
FIG. 5 is a detailed circuit diagram of the portion of the transmitter showing a differential driver with a constant current source.

In the detailed circuit diagram of a portion of a transceiver as shown in FIG. 5, the output of the differential amplifier A1 is coupled to a differential driver 31 which consists of two transistors Q1 and Q2 and one constant current source 32. Resistors R2 and R3 limit the input current of the differential driver 31. Capacitors C2 and C3, in parallel with resistors R2 and R3 respectively, can speed up the response of the differential driver 31. A rise time limiting or suppressor capacitor C1 limits the transfer data signal by suppressing the higher order harmonic of the square wave input signals to the differential driver 31.

Further referring to FIG. 5, transistors Q1 and Q2 are alternately "on" or "off" according to the input data signal. For the purpose of balancing the total power consumption of this and other differential drivers, a dummy load R1 is applied to the collector of transistor Q2. Two diodes D1 and D2 are connected to the collector of transistor Q1. Since the P-N junction of the serially connected diodes D1 and D2 acts as serially connected capacitors, the capacitance effect of the transmitter 20 is reduced.

Figure 4:
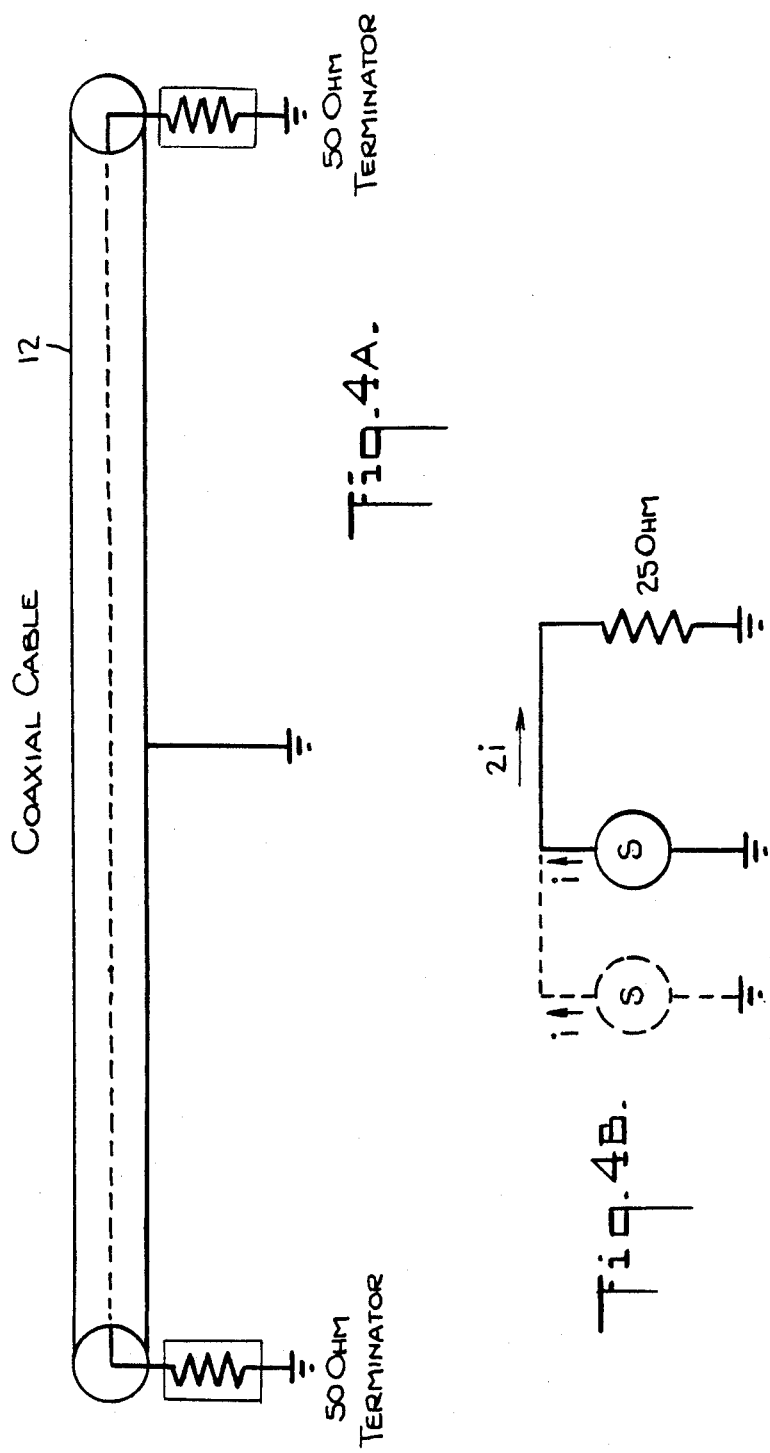
FIGS. 4A and 4B are illustrations of the theory of current drive and collision detecting methods with FIG. 4A depicting a coaxial cable with two terminators and FIG. 4B depicting a circuit equivalent of FIG. 4A.

In FIG. 4A there is shown a segment of coaxial cable with two terminators on each end of the coaxial cable. FIG. 4B is an equivalent circuit of FIG. 4A. The two 50 ohm terminators of FIG. 4A are shunted on each end of the coaxial cable, shown as the equivalent value of 25 ohms in FIG. 4B extending from the center conductor to the shield of the coaxial cable. Because the transmitter 20 drives the coaxial cable 12 using a device of constant current source 32, the voltage drop appears on the 25 ohm resistor, so that the voltage source appears located on the two ends of the coaxial cable 12, with the advantage that operation is independent of the distance between transmitting and receiving stations.

A collision will occur at anytime that, at the same time, more than one station transmits data to the coaxial cable. The total current will be the sum of all output current of the transmitters, as shown in the diagram of FIG. 4B. When collision occurs, the voltage difference between the center conductor and the shield of the coaxial cable is larger than in the normal condition. A collision is easily detected by monitoring the DC level of the coaxial cable.

Figure 3:
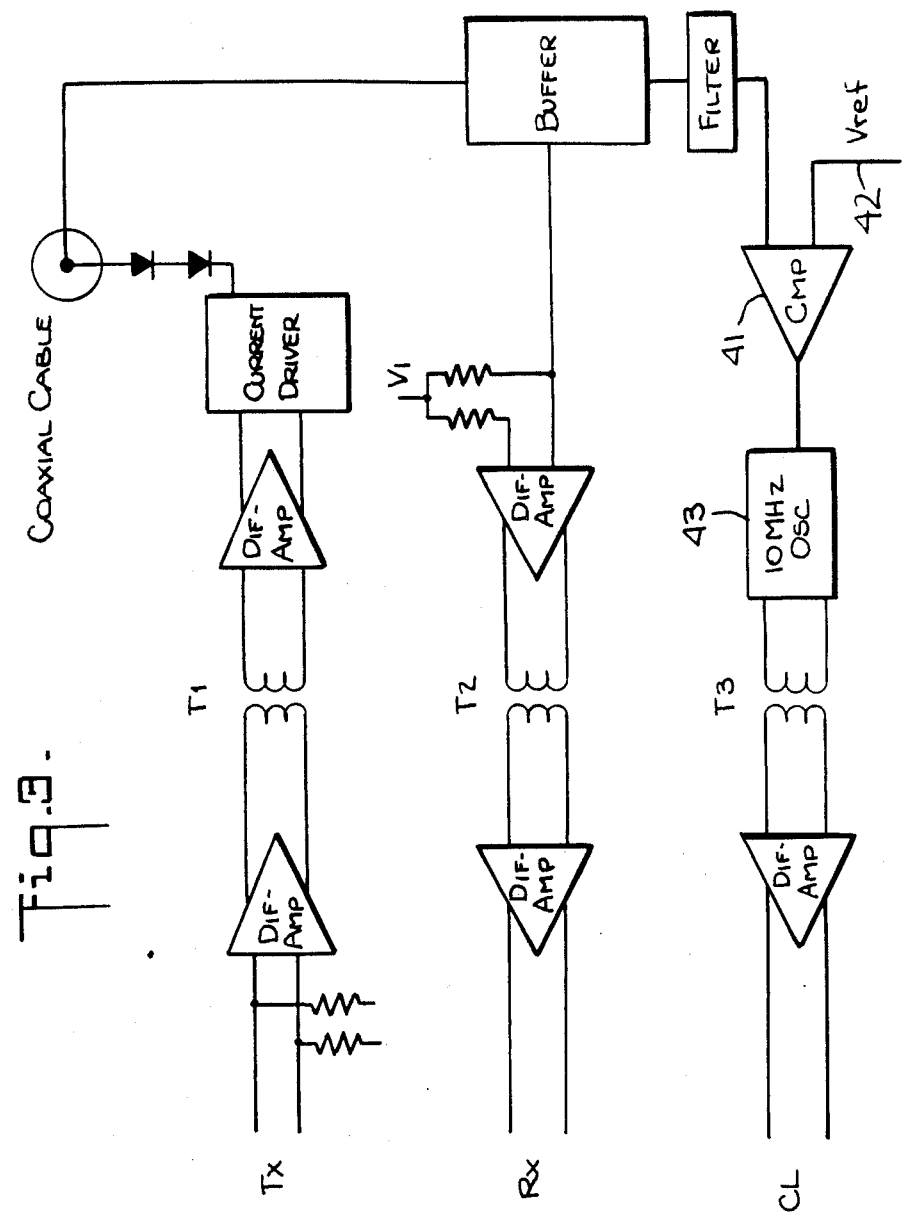
FIG. 3 is a more detailed circuit diagram of the transceiver depicted in the block diagram of FIG. 2.

Referring to FIG. 3, the lowest path designated by CL is the collision path in the circuitry. A high speed comparator 41 compares the incoming voltage on collision path CL with a reference voltage 42. When the incoming voltage is more negative than the reference voltage 42, a collision is designated. The output of the comparator triggers the 10 MHz. oscillator 43 to action to report this collision. This signal and both transmitter and receiver signals must pass through pulse transformers, T3 for the collision path CL, T1 for the transmitter path TX, and T2 for the receiver path RX, for connecting the communicating medium, coaxial cable 12 to data terminal equipment 11. If the incoming voltage on collision path CL is higher than the reference voltage 42, no collision is designated.

The invention has been described with reference to a limited number of embodiments and it is apparent that various modifications will occur to those skilled in the art and should be included within the scope of the invention and the invention should only be limited as defined by the appended claims.

What is claimed is:

1. A data communication transceiver connected to data terminal equipment for transmitting signals of transmitted data from the data terminal equipment to a communicating medium, receiving signals from the communicating medium which are generated by another transceiver, and detecting collisions occurring on the communicating medium by simultaneous operation of another transceiver transmitting signals to the communicating medium, the transceiver comprising:

transmitter means to drive the transmitted data into the communicating medium, said transmitter means including a differential driver to sink constant current to the communicating medium, said differential driver including a pair of emitter connected transistors, and a dummy load connected to a collector of one of said pair of transmitters, said dummy load balancing the power consumption of the differential driver and the connected data terminal equipment and communicating system;

receiver means to receive data from the communicating medium;

collision detector means for detecting and reporting the collision occurrence to the data terminal equipment;

DC to DC converter means to provide power ground isolation between the data terminal equipment and the communicating medium;

pulse transformer means isolating a signal ground between the data terminal, equipment and the communicating medium.

2. The data communication transceiver of claim 1 wherein
said transmitter means includes
a suppressor means to limit the bandwidth of the transmitted data.

3. The data communication transceiver of claim 1 wherein
said transmitter means includes
a suppressor capacitor means to suppress a high order harmonic of the transmitted data.

4. A data communication system having a data communication transceiver connected between data terminal equipment and a coaxial cable communicating medium comprising the data communication transceiver including
transmitter means sending transmitted data from the data terminal equipment to the coaxial cable communicating medium,
said transmitter means including a differential driver having a pair of emitter connected transistors with their emitters connected to a constant current source, a pair of serially connected diodes connected between the communicating medium and a collector of one of said pair of transistors, and a dummy load connected to a collector of the other of said pair of transistors;
receiving means receiving data from the communicating medium;
collision detector means for detecting and reporting a collision occurrence on the communicating medium to the data terminal equipment;
and DC to DC converter means to provide power ground isolation between the data terminal equipment and the communicating medium;
said collision detector means including
means to monitor the DC level of the communicating medium.

5. The data communication system of claim 4 wherein
said means to monitor the DC level of the communicating medium includes
a high speed comparator having an input from said communicating medium;
reference voltage means connected as another input to said high speed comparator;

an oscillator connected to an output of said high speed comparator and triggered to activation when input voltage from said communicating medium to said high speed comparator is lower than input voltage to said high speed comparator from said reference voltage means.

6. The data communication system of claim 4 wherein said transmitter means includes a suppressor capacitor shunting inputs of said differential driver;

an output of said differential driver connected to the communicating medium.

7. The data communication system of claim 6 wherein said transmitter means further includes a parallel connected capacitor and resistor connected to each of said inputs of said differential driver.

8. The data communication system of claim 6 wherein said differential driver limits the current and power consumption of the transceiver.

9. The data communication system of claim 4 wherein said communicating medium is a long line coaxial cable terminated by resistance means at each transceiver location.

* * * * *